US009619065B2

(12) United States Patent
Kovalev (10) Patent No.: US 9,619,065 B2
(45) Date of Patent: Apr. 11, 2017

(54) ELECTRONIC COIN HAVING A DISPLAY (71) Applicant: Alexei Kovalev, Moscow (RU)

(72) Inventor: Alexei Kovalev, Moscow (RU)

( * ) Notice: Subject to any disclaimer, the term of this patent is extended or adjusted under 35 U.S.C. 154(b) by 0 days.

(21) Appl. No.: 14/556,150

(22) Filed: Nov. 30, 2014

(65) Prior Publication Data
US 2016/0155425 A1    Jun. 2, 2016

Related U.S. Application Data (60) Provisional application No. 61/910,122, filed on Nov. 29, 2013.

(51) Int. Cl.
G06F 3/147    (2006.01)
G06F 3/041    (2006.01)

(52) U.S. Cl.
CPC ............ G06F 3/0412 (2013.01); G06F 3/147 (2013.01); G09G 2330/023 (2013.01); G09G 2380/00 (2013.01)

(58) Field of Classification Search
CPC ..................... G07F 17/3211; G06K 19/047
See application file for complete search history.

(56) References Cited

U.S. PATENT DOCUMENTS

| 6,109,530 | A | * | 8/2000 | Larson | G06K 19/0702 235/492 |
| 6,205,816 | B1 | | 3/2001 | Lu | |
| 6,629,591 | B1 | * | 10/2003 | Griswold | G07F 1/06 194/205 |
| 7,793,445 | B2 | | 9/2010 | Lawrence | |
| 2008/0268938 | A1 | * | 10/2008 | Doutriaux | G07F 1/06 463/17 |
| 2013/0190076 | A1 | * | 7/2013 | Sammon | G07F 17/32 463/25 |

FOREIGN PATENT DOCUMENTS

| CN | 2829426 | 11/2012 |
| CN | 102511978 | 11/2013 |
| EP | 2594149 | 5/2013 |
| RU | 2194426 | 1/2010 |

* cited by examiner

Primary Examiner — Amare Mengistu
Assistant Examiner — Sarvesh J Nadkarni
(74) Attorney, Agent, or Firm — Joshua Kaplan Esq.; J Kaplan Law Practice LLC (57) ABSTRACT The present invention is a coin device having a module containing a display screen a power source and a system board providing circuitry to link all of the components of the present invention. The display screen and internal circuitry are protected by an outer shell, which forms a protective casing around the coin. The outer shell may be made of any material, including conventional metals and alloys used in minting. The circuitry may or may not be detachable from the protective casing.

26 Claims, 11 Drawing Sheets

ELECTRONIC COIN HAVING A DISPLAY

CLAIM OF PRIORITY

This application claims prior of a U.S. Provisional Application No. 61/910,122, filed on Nov. 29, 2013, the contents of which are fully incorporated herein by reference.

FIELD OF THE INVENTION

The present invention relates to a micro-display device, in particular small tokens capable of displaying self-contained imagery data.

BACKGROUND OF THE INVENTION

Coined money has always served as an item of barter. Coins and tokens have been traditionally utilize to bestow some honor or accolade on their receiver or possessor. Coins still continue to fascinate collectors, and frequently are the main, or the only, actual physical item that still survives and testifies about bygone epochs.

Presently, coins or tokens have been primarily minted or forged to satisfy some single specific purpose. Changing this purpose requires minting a new or different coin. Furthermore, display space on the surface of a coin is extremely limited, causing the face to contain only the bare essentials. Fine details are often crude or left out altogether due to artificial curbs placed on production costs, and due to technological limitations of standard minting practices.

In some instances, tokens fulfill an educational or testimonial purpose by paying tribute to some object, place or event. In the latter capacity, a token has limited utility due to extremely limited space of the coin faces or top surfaces. The minters of such coins are faced with reducing the face image to some arbitrary symbol that represents the purpose of the coin. Frequently the symbol is meaningless to all except the select few that designed or approved the symbolic coin. The present invention aims to correct this existing shortcoming, by introducing descriptive pictures, graphics and short video clips that will be a lot more informative to wide audiences, and thus increase awareness or popularity of an object, place or event being depicted on such a coin.

Overwhelming majority of coins today that are used as money, albeit possessing little if any intrinsic value. Coins represent one of the earliest form of what used to be commodity money. Since it is generally easier to counterfeit coins than paper money, coins of higher value, like the Euro or the Dollar coins are frequently forged, prompting governments to take extensive measures to guard against counterfeiters. One of the main anti-counterfeiting measures has been the use of dual metal forging. The significant cost of this technique has been the main deterrent against forgeries. However, proliferation of sophisticated dyes has undermined the effectiveness of the dual forging technique.

The present invention can easily replace traditional coins as money, while at the same time tremendously shoring up the anti-counterfeiting measures. The minting authorities will now be able to implement efforts such as authentication ships, and the use of remote uploaded imagery that is synchronized with a central source. The ability the change images will serve to add tremendous flexibility to the appearance of a coin at any given moment, as well as counterfeit manufacturing much too expensive to justify the effort and the risks.

The present invention features a display screen that shows images of data that is stored within the display screen, or with the coin itself. The image displayed may indicate the source of the coin, the purpose of minting or monetary denomination. The display screen may be adapted to many purposes. Therefore, changing the stated value of a coin may be as easy as loading a new image or installing a new display screen.

BRIEF DESCRIPTION OF THE RELATED ART

U.S. Pat. No. 6,205,816 Disclosing a twin-heart commemorative coin comprising a coin body with a twin-heart shaped opening at the center, a connecting element with two fixing holes extended from the coin body to the opening. Two heart-shaped components of the same shape and structure, having a recess with a column and a hole at the recess. The two heart-shaped components can be overlapped at the twin-heart opening in a manner that the recesses are aligned with the connecting element so that the respective columns pass through the fixing holes at the connecting element for fitting to the respective holes of the other component to form a twin-heart commemorative coin.

U.S. Pat. No. 7,793,445 To a device having a body comprising a ring and a diametric bridging member is adapted to receive and retain dissimilar markers or indicia on the opposing sides of the body. The bridge member diametrically spans the void within the ring member. The bridge member preferably includes a hole to receive a permanent magnet. The ring member is adapted to receive first and second indicia, each of which is formed of iron or an iron alloy. The first and second indicia are held within the ring member by the magnet, and lie flush with the outer top and bottom surfaces of the ring member to present the appearance of a single article of manufacture. If desired, the first and second markers may be replaced with other markers, thereby altering the appearance of the coin flip token.

Various implements are known in the art, but fail to address all of the problems solved by the invention described herein. One embodiment of this invention is illustrated in the accompanying drawings and will be described in more detail herein below.

SUMMARY OF THE INVENTION

The present invention is a coin device having a module containing a display screen a power source and a system board providing circuitry to link all of the components of the present invention. The display screen and internal circuitry are protected by an outer shell, which forms a protective casing around the coin. The outer shell may be made of any material, including conventional metals and alloys used in minting. The circuitry may or may not be detachable from the protective casing.

One of the objectives of the present invention, is to increase consumer and collectible attractiveness of the coin (token) with video images and expanding the scope of its application as a training manual for people of any age, studying history, music and other humanitarian and technical disciplines.

Another objective of the present invention is to enable an electronic coin through the use of novel micro linkages between components, which fuses novel and existing technologies together.

It is another objective of the present invention to provide an additional degree of protection against forgery, ensured by the fact that the coin (token) with video images, characterized by the presence of the metal body and socket for the module, consisting of the screen, solar battery and electronic circuit and the body of the coin (token) and the module connected with each other.

It is another objective of the present invention to provide a coin to be used as money in the trade of goods and services, where the denomination of such a coin is determined in part by the internally saved image.

Yet another objective of the present invention is to provide a coin capable of emulating imagery on a micro screen, yet be durable, damage resistant and impermeable to elements of nature.

It is yet another object of the present invention to provide an electronic coin having an integrated power source, which may be a solar battery or an electron discharging battery. It may also be a combination power source comprised of a solar battery linked to a rechargeable battery or a capacitor.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
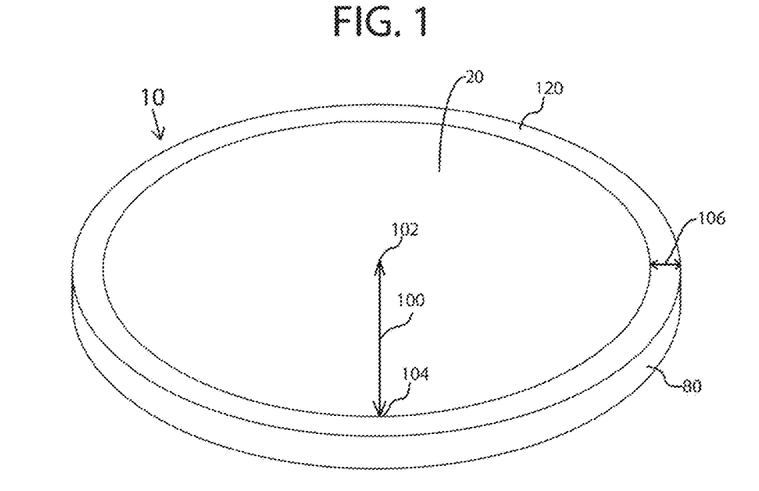
FIG. 1 is a perspective top and side views of the present invention.

Turning now descriptively to the drawings, in which similar reference characters denote similar elements throughout the several views, the figures illustrate several embodiments of the present invention. Seen in FIG. 1 a coin device 10, a module 20, a top area 120 also known as the coin face, and a protective casing 80. The radius 100, measured from the center 102 of the coin 10 to the edge 104, is preferably between five millimeters and ten centimeters. Of this radius 100, approximately between three millimeters and three centimeters is taken by the width of the border 106 formed by the protective casing 80 around the circumference of the coin 10. The border 106 may be uniform in width throughout the top area 120, or may be variable in embodiments where the display screen 30 is off center, is not a perfect circle, or is assembled as a square, a triangle or an alternative geometric shape. The top area may range between four square centimeters and twenty five centimeters, but other sizes are possible.

Figure 2:
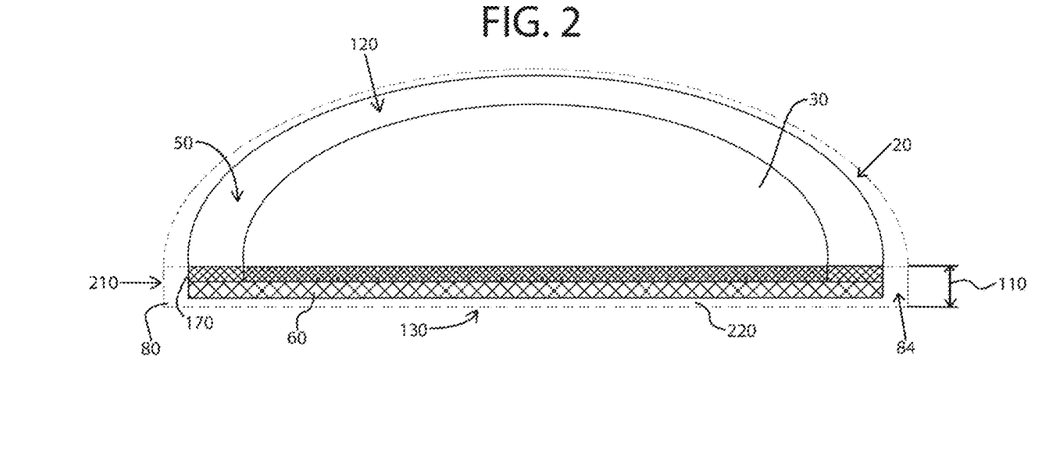
FIG. 2 is a cross-sectional view of the present invention as depicted in FIG. 1.

FIG. 2 is a high level cross sectional embodiment of the present invention. Shown in FIG. 2 are a module 20, a display screen 30, an integrated power source 50, on a system board 60, a storage module 264 (FIG. 9), a protective casing 80, a thickness 110, a top area 120, a bottom area 130, and a solar cell 170.

The module 20 is comprised of the display screen 30 and all protective and connective attributes of the display screen 30, as will be discussed shortly, including the integrated power source 50, and the system board 60. The system board 60 contains electronic circuitry required to enable the present invention and is preferably made from silicon, or other semi-conductive, non-conductive, high or low thermal materials. In some embodiments, the power source 50 may be present only during manufacturing phase, and used to imprint or "engrave" the image onto the display screen 30 for embodiment where the display screen 30 uses bistable or electronic ink technologies. Since in bistable displays electric current needs to be supplied only to make changes, display coins with a single stored image need only be "recorded" once and are then able to maintain the imprinted image without additional supply of electric power. Alternatively, such a coin 10 may provide means for exterior connection to a source of electric current, to enhance, change or recharge the image on the display screen 30.

FIG. 2 demonstrates a solar cell battery 170 as the power source 50. Furthermore, the solar cell is shown surrounding the display screen 30. The actual configuration of the solar cell 170 and the display screen 30 with respect to each other may vary. In some embodiments, the display screen 30 may be concentrated in one section of the top area 120, while the solar cell battery 270 in another section. The power source 50 may also be disposed within the side 210.

Figure 6A:
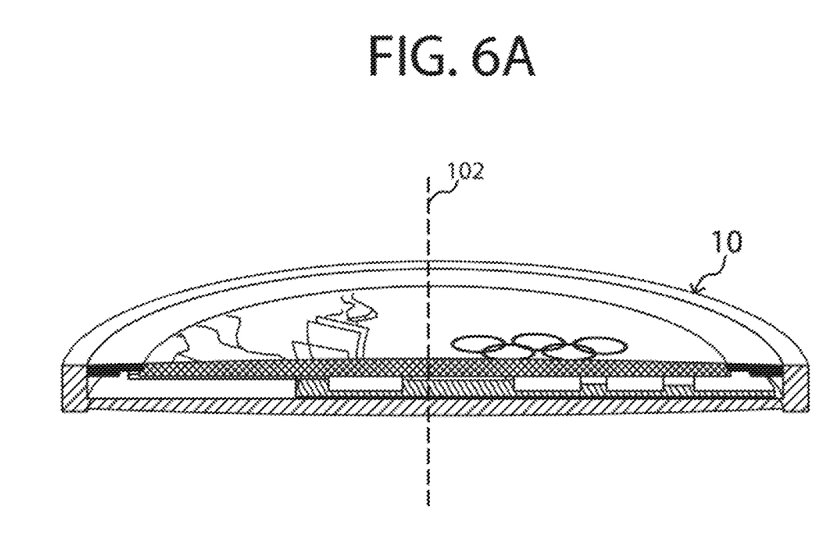
FIG. 6A/6B is a concave and convex embodiment of the present invention.
Figure 6B:
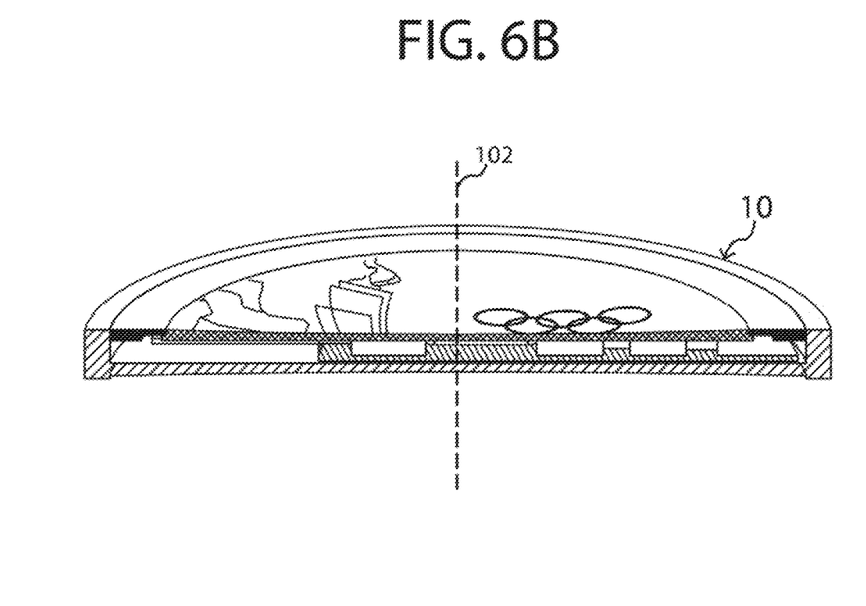

The preferred total thickness 110 of the present invention is between three millimeters and one centimeter, which includes the thickness of the module 20 combined with the bottom side 220. The actual thickness of the module 20 and the bottom side 220 may vary depending on an embodiment. The thickness 110 may be uniform throughout the cross-section of the coin 10, or may vary between areas closest to the sides 210 and the center 102. For example in convex or concave embodiments of the coin 10 the thickness 110 will vary depending on how close or far apart from the center 102 is the point where the thickness measurement is taken (FIGS. 6A and 6B).

The protective casing 80 may be manufactured out of a single section of materials or may be comprised of several components, which may be of the same or different material as the other sections of the protective casing 80. The materials for the protective casing 80 should preferably possess surface and structural hardness with exceptional durability. Included in the category of such materials, are metals, including steel, alloys, precious metals, wood, rubber, resin or a reinforced polimer. The interior structure 84 of the protective casing 80 may be made of a solid material that is the same or different from the other components making up the protective casing 80. The interior structure 84 may be solid, hollow or contain structural ribs, all of which is intended to enhance the shielding of the module 20 from a lateral impact or lateral crushing.

Figure 3:
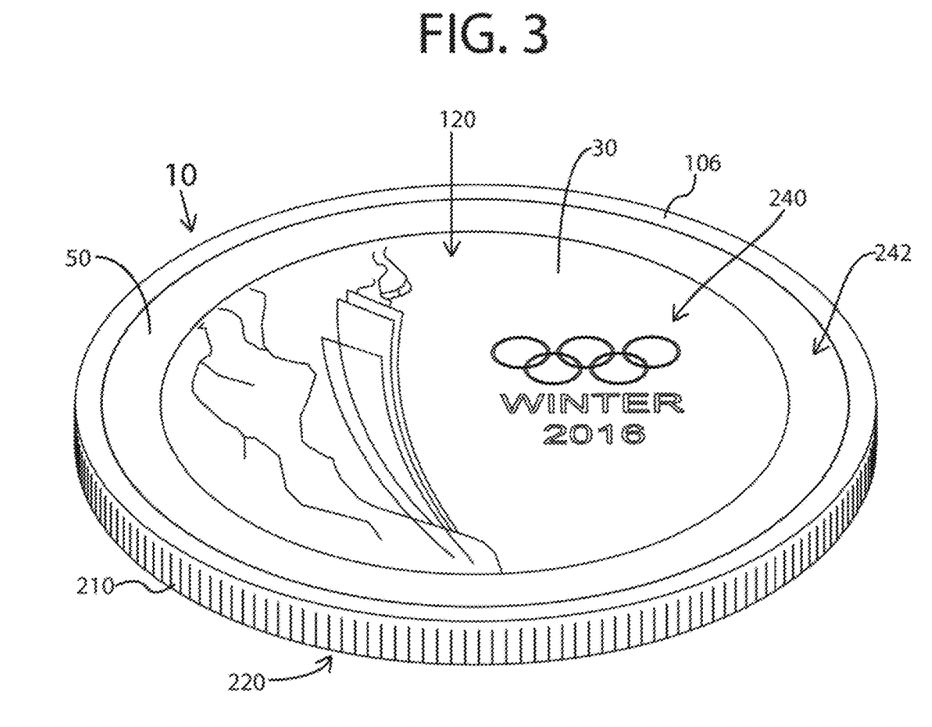
FIG. 3 is a top view of the preferred embodiment of the present invention.

FIG. 3 is perspective top view of the preferred embodiment of the present invention. Shown is the coin or token device 10, the display screen 30, the power source 50, the border 106, the side or sidewall 210, the display area 240, and the power source area 242. The border 106 is preferable. However, the module 20, which in the case of the figure is made up of the display area 240 and the power source area 242, may be mounted to the bottom side 220 without a border 106 with the side of the module forming the side of the coin 10. The display area 240 and the power source area 242 are preferably on the same plane with each other, comprising the top side or top face 120 of the present invention.

The power source 50 may be a photovoltaic cell, commonly known as the solar battery. The power source 50 may also be a discharging device that discharges electric current through internal chemical reactions, such as but not limited to an alkaline battery or a lithium ion battery. The power source 50 may be a combination of solar cell and a lithium ion, or another form of discharging or rechargeable cell, such as a solar cell used to provide power to the coin 10 when light is available, and an electrochemical battery providing current when the solar battery has run dry. The two forms of battery power can be interconnected, so that the solar battery is able to recharge the discharging battery when a light source is available. The power source 50 is shown surrounding the display screen 30, and being easily accessible from the top area 120. This is a desirable design, as it permits easy repair of the device in the event that the power source 50 malfunctions. The power source 50 can be removable to enable quick repairs without having to disassemble or discard the coin.

Figure 4:
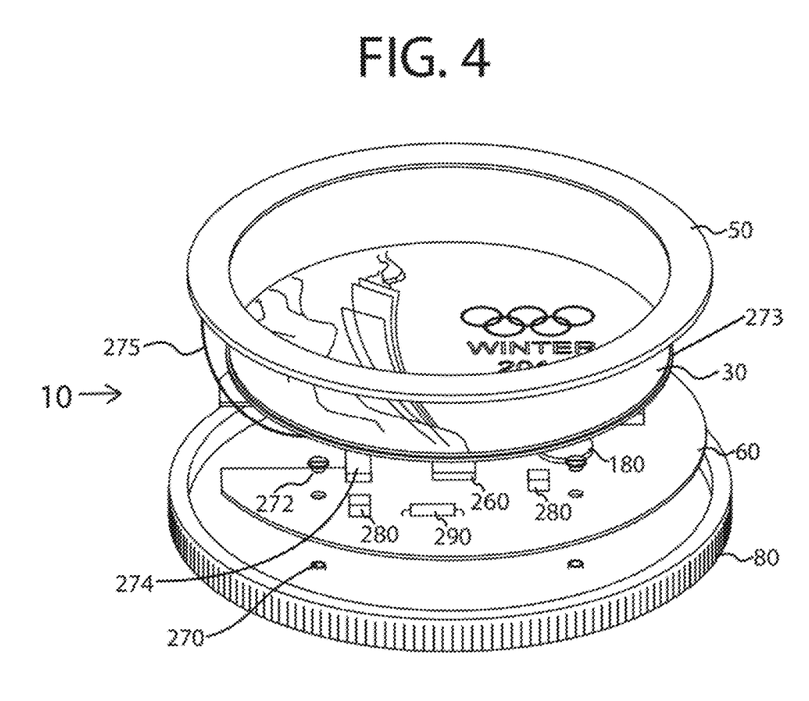
FIG. 4 is an exploded view of the preferred embodiment of the present invention.

In FIG. 4 the components of the preferred embodiment of the coin are exploded to demonstrate the structure of the device. Shown is the coin 10, the power supply 50, the display screen 30, the system board 60, and the protective casing 80. Also seen in the FIG. 4 is wiring 275, connection joint 270, fastener 272, affixing edge 273, a logic module 260, a discharging module 180, bushings 280, and miscellaneous electronic components 290.

The wiring 275 connects the system board 60 to the power source 50 and the display screen 30. Alternatively, power can be transmitted using connection joints 270 or similar devices. For example these components can be threaded or snapped together. The place where the components are mated together by the particular joining technique, such as threading or a snap connection among others, can be made of conductive materials, thus achieving dual purpose of holding the coin 10 together while enabling the electronics to function. The display screen 30 may contain touch functionality, which further requires bi-directional data and electronic impulse connection with the system board 60. The display screen 30 is preferably made from scratch proof and reinforced materials to prevent scratching or shattering and extreme durability that is fit for a device that may be dropped, thrown, dipped in water or otherwise mistreated without breaking, losing structural integrity, or without losing recorded imagery. The connection between the various components of the present invention can also be achieved using a rivet connection, a threaded connection, screw or fastener connection, of a bayonet connection, adhesive bonding, by means of welding, by means of pressing. Some or all of these connection types can be insulating or conductive, depending on the need or embodiment. The coin 10 (token) protective casing 80 and the module 20 can be connected with each other by means of rolling, dispensing, forge-rolling, using solder joints, using molding, stitching—or any combination of the aforementioned methods.

Figure 5:
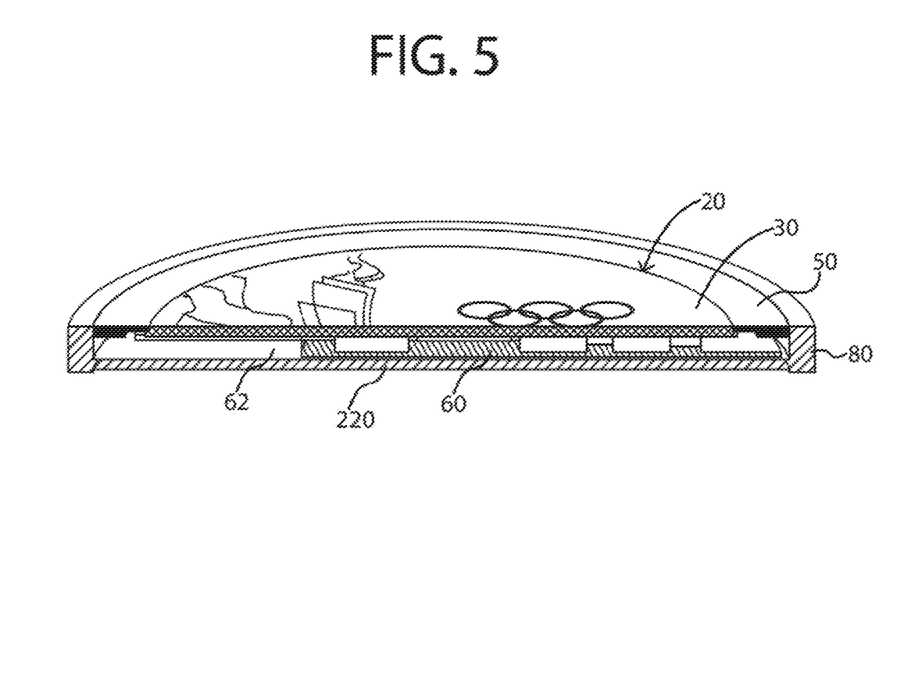
FIG. 5 is a cross-sectional view where the display screen forms part of the top surface of the present invention.

FIG. 5 is a cross sectional view of the present invention. Shown is the module 20, the protective casing 80, the system board 60, the bottom side 220, the wire slot 62, and the integrated power source 50. The wire slot 62 is an empty area between the display screen 30 and the bottom side 220. Preferably the slot 62 is used to hold wires, but may hold other components, such as capacitors or batteries.

FIGS. 6A and 6B are alternative embodiments of the present invention. FIG. 6A is a cross-sectional representation of a convex coin 10 with respect to the center 102, while FIG. 6B is a cross-sectional representation of a concave coin 10 with respect to the center 102.

Figure 7:
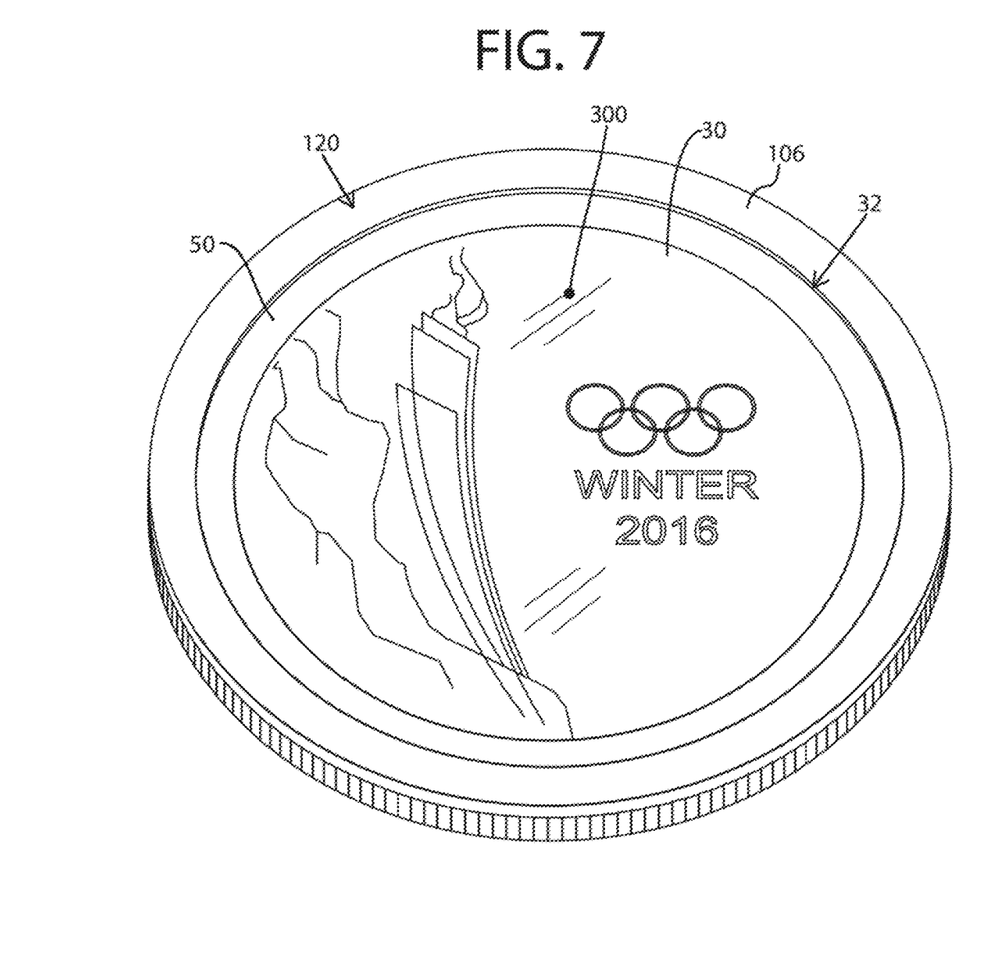
FIG. 7 is a top view of the present invention showing a protective screen.

The display screen 30 shown in FIG. 7, along with the integrated power source 50, is recessed with respected to the border 106. Alternatively, only the display screen 30 is recessed, or only the power source 50 is recessed. The recesses 32 would preferably be a slight depression throughout the top area 120 and be covered with a protective transparent material 300 that would serve to prevent scratches and other damage of the present invention. The protective material 300 can be used to channel touch commands to the display screen 30, which in turn would channel them to the logic module 260.

The display screen 30 is shown being circular. However other shapes are possible, including an oval, square, rectangular or triangular shapes. The border 160, the power source 30 and the display 30 all form part of the top area 120, which would preferably range between four square centimeters and thirty five square centimeters. The display screen 30 may implement various types of emulation format, including but not limited to plasma, liquid crystal, light emitting diode, or be emulated through electronic ink or other forms of bystable displays, including electrophoretic or electro wetting techniques, or any technique known to work with display screens of this size and type. Both the display screen 30 and the protective screen 300 may be able to respond to sensory or touch commands from a user.

Figure 8:
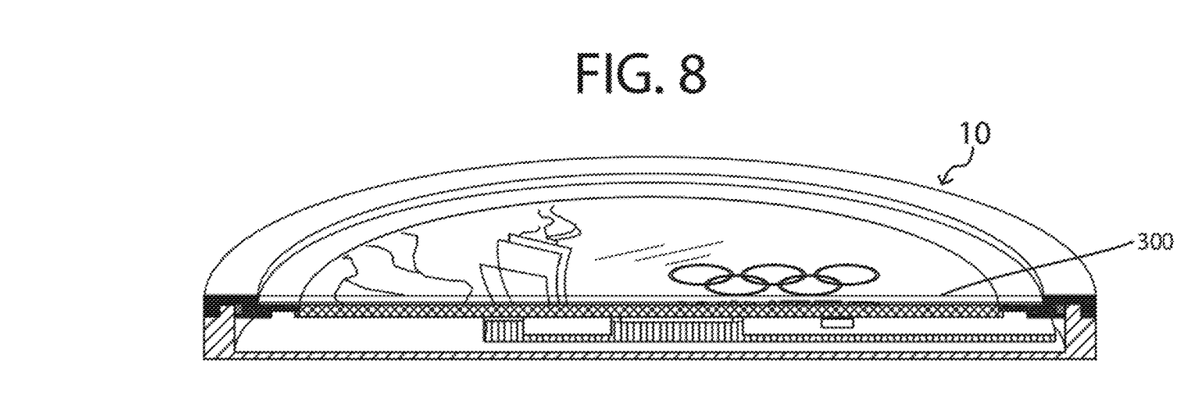
FIG. 8 is a cross section view of the alternative embodiment of the present invention.

FIG. 8 is a cross sectional representation of the coin 10 shown in FIG. 7, showing a different angle view of the protective screen 300. The protective screen 300 may be made from the same or different materials than the display screen 30. It may consists of laminated glass, plastic, a reinforced polymer, or any other transparent shatter resistant material.

Figure 9:
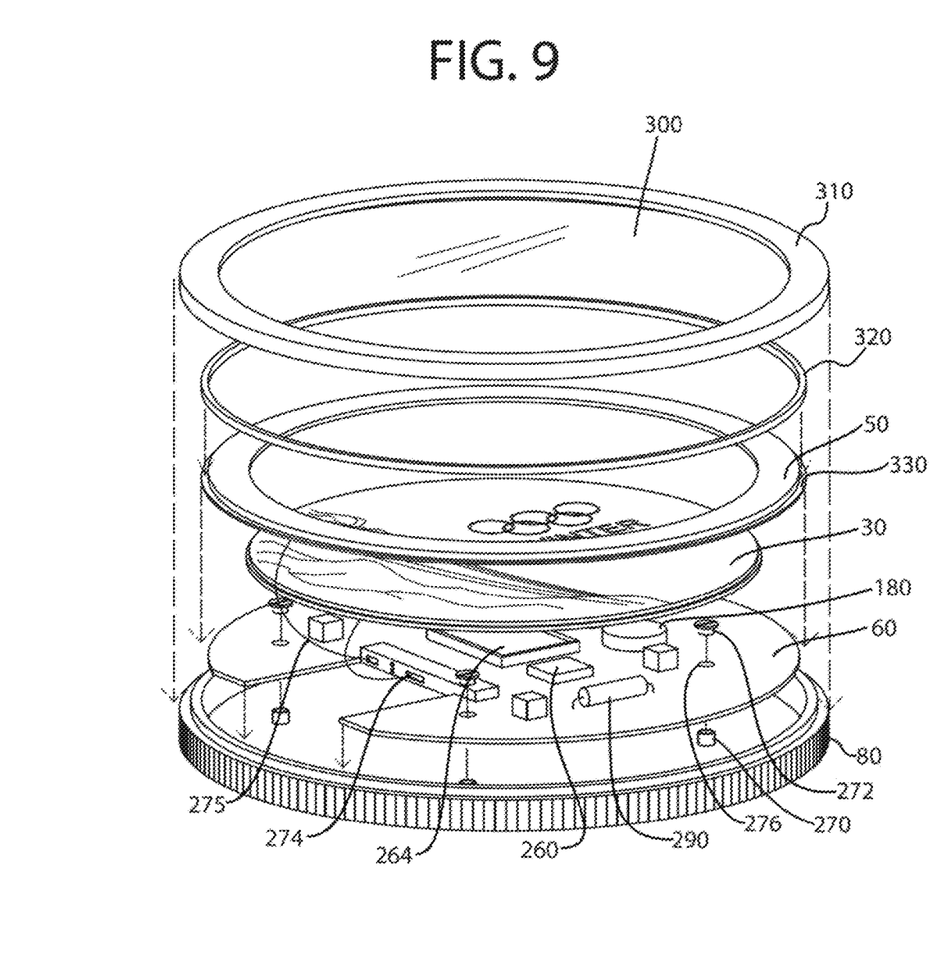
FIG. 9 is an exploded view of an alternative embodiment.

FIG. 9 shows an exploded view of an alternative embodiment of the present invention which includes the protective screen 300. Also shown is the border 310 of the protective screen 300, tension ring 320 that fits side the flange 330 and adds fastening and to overall strength of the connecting components. The protective material forming a screen 300 may be removable separately or together with the border or frame 310 from the rest of the protective casing 80. Also shown is the power source 50, the system board 60, a discharging module 180, the protective casing 80, the wire connection points 274, wiring 275, the logic module 260, sockets 270, fasteners 274, logic module 260, and data exchange or storage module 264. The logic module 260 may integrate a memory module, in addition there may be a wireless receiving module, wherein such receiving module technology is well known to those skilled in the art. The size and placements of the aforementioned components may vary depending on embodiments. Also depending on embodiment, additional components may be present, and some of the existing components may be omitted. The various components of the present invention may be made using casting, stamping, minting, milling, cutting, chipping, using galvanoplastic, galvanostegy, and 3D printing.

Figure 10A:
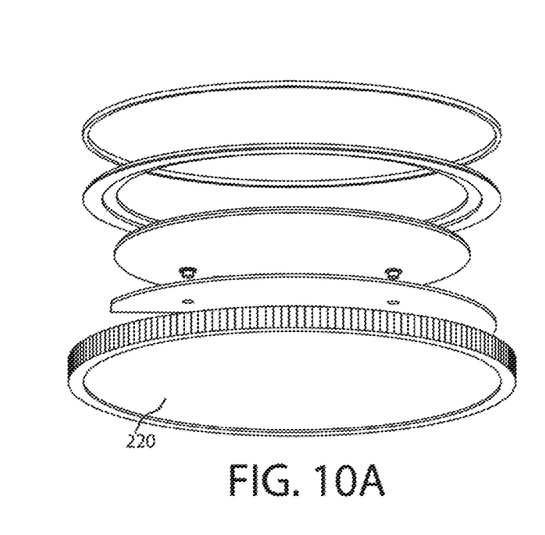
FIGS. 10A-10C are bottom oriented views of the present invention, with FIG. 10C showing an alternative embodiment.
Figure 10B:
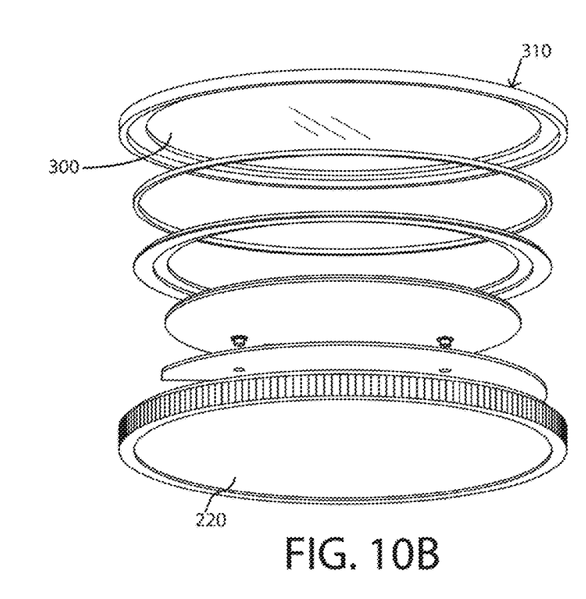
Figure 10C:
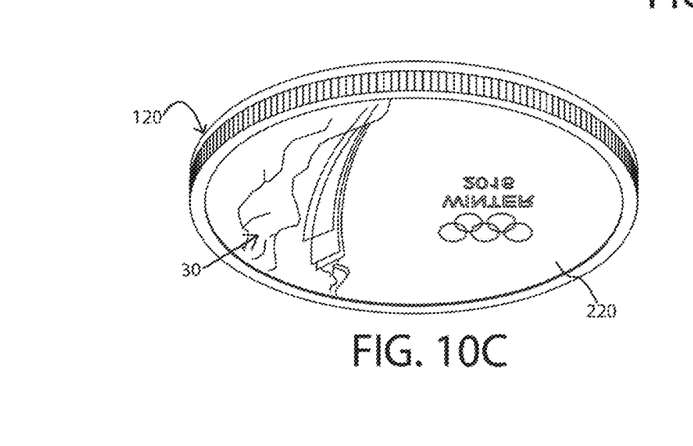

FIGS. 10A-10C demonstrate the bottom view of the present invention. FIG. 10B shows the addition of the protective surface 300. The present invention is presented as a disk, since this is the traditional and standard embodiment of coined money, medals and other commemorative coins. However, one skilled in the art will appreciate that any shape can be possible, including but limited to, a square, a rectangle, a triangle, or any other geometric shape. The various components of the present invention are substantially insulated and are water and element proof due to the use of multiply layered hermetic seal.

FIG. 10C demonstrates another alternative embodiment, where a display screen 30 is placed on the bottom side 220. The image used can be the same as appearing on the top area 120, or may be an alternative image. The protective casing 80 may then be comprised of a side 210 and an internal rigidity frame, with the system board 60 serving both screens, or with another board serving the bottom side screen.

Figure 11:
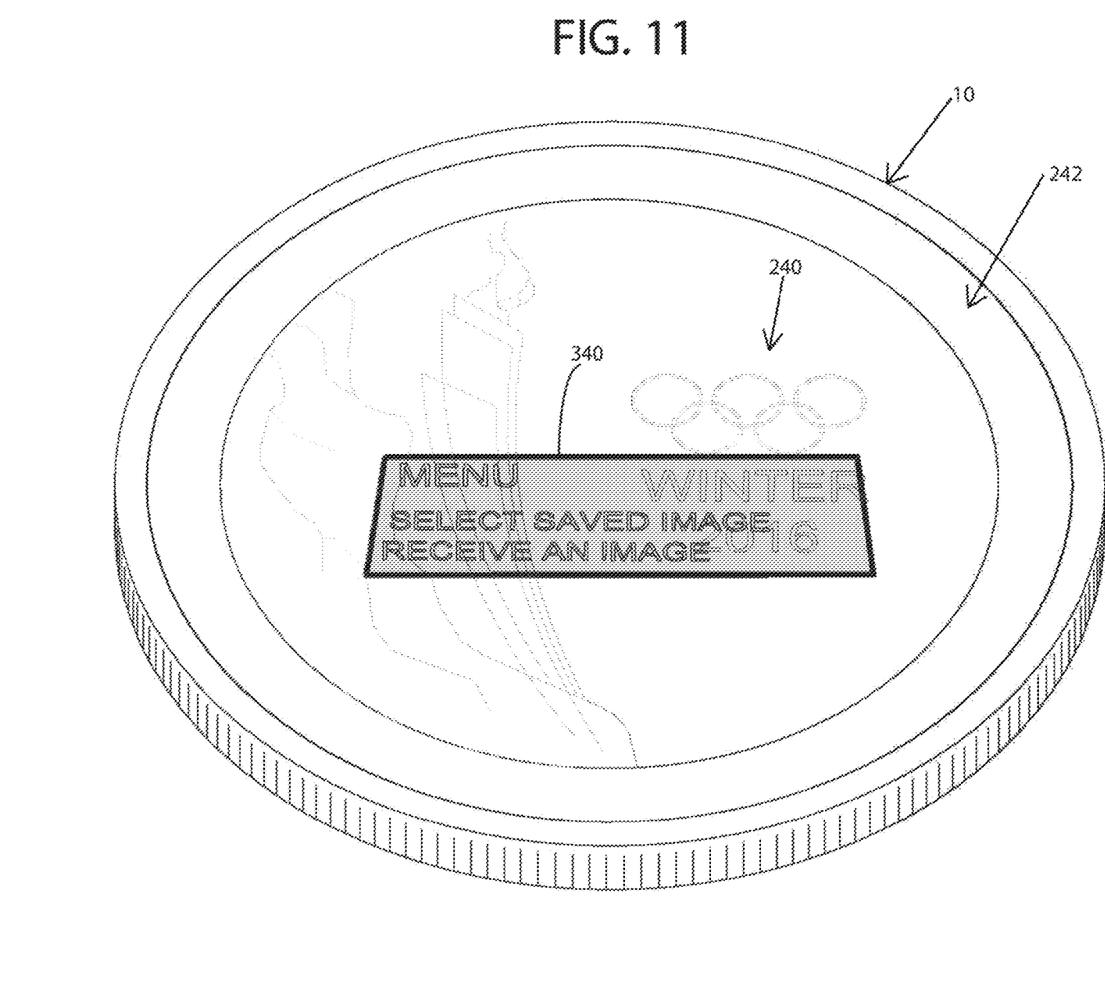
FIG. 11 shows another alternative embodiment being able to receive data.

FIG. 11 demonstrates that the potential of a coin capable of emulating images are quite broad. The coin 10 is showing having the display section 240 and the power source area 242. The power source area 242 may further be equipped to emulate images, for example stock ticker or emergency announcement or flash messages. The device 10 may also be a single record device or be capable of receiving data. A single recording device will then produce images to the screen that are stored on the local memory module or written once to the display screen 30 at manufacturing phase. A device capable of receiving data may be able to receive messages wirelessly, or may have a connector to download messages from an external source. The user would then be able to control which data is displayed using the menu emulation tool. This embodiment would require significant intelligence and at the minimum contain the wire connectors 274, logic module 260, a receiving module 260 and an emulating module (not shown).

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A coin device comprising, a module said module being an assembly of hardware components having a display screen on a top side, said display screen being a thin plate, a system board capable of supporting an integrated power source, wherein said power source forming a ring around said display screen, said system board containing a storage module, said storage module being a hardware component capable of storing data, wherein said display screen is closely mated with said system board; and a protective casing, wherein said module is mounted onto said protective casing, wherein said display screen is capable of displaying data contained on said storage module through said protective casing and wherein said coin device having a thickness of up to four millimeters.

2. The coin device of claim 1, wherein said coin device is substantially a disk.

3. The coin device of claim 2, wherein said disk having a radius ranging between five millimeters and five centimeters.

4. The coin device of claim 2, wherein said disk having a radius ranging between 5 millimeters and ten centimeters.

5. The coin device of claim 1, wherein said demonstrative device having a top area ranging between four square centimeters and twenty five square centimeters; and having a thickness ranging between three millimeters and one centimeter.

6. The coin device of claim 1, wherein a cross-sectional sample through the center of the device has a convex shape.

7. The coin device of claim 1, wherein a cross-sectional sample through the center of the device has a concave shape.

8. The coin device of claim 1, wherein said power source is a solar cell.

9. The coin device of claim 8, wherein said power source substantially surrounds said display screen; and wherein a top surface of said power source and a top surface of said display screen are substantially level with each other.

10. The coin device of claim 8, wherein said solar cell provides electric current to charge a rechargeable battery.

11. The coin device of claim 1, wherein said power source is a discharging battery.

12. The coin device of claim 1, wherein said protective casing forms a barrier between sides and a bottom side of said module, and wherein a top side of said module is covered with a protective material, said material being transparent, said top side being substantially a display section of said display screen, said protective transparent material being removably connected to said protective casing.

13. The coin device of claim 12, wherein said protective transparent material is being removably attached to said protective casing.

14. The coin device of claim 12, wherein said protective transparent material is capable of channeling finger touch commands to said top side of said display screen.

15. The coin device of claim 12, wherein said protective transparent material is substantially shatter proof and impregnable to corrosive elements comprised of water and air.

16. The coin device of claim 1, wherein said protective casing may be made from a group comprising a metal, a metal alloy, wood, a polymer material or rubber.

17. The coin device of claim 1, wherein said display screen may be made from a group comprised of plasma, liquid crystal, light emitting diode (LED), or a bistable display.

18. The coin device of claim 1, wherein said display screen is capable to responding commands submitted via touch.

19. The coin device of claim 1, further comprising a logic module, said logic module being a hardware component of said module, said logic module sorting said data stored on said storage module; said logic module displaying a menu on said display screen; and wherein a user utilizing said menu in selecting a display of a specific subset of said data.

20. The coin device of claim 1, further comprising a receiving module, said logic module being one of the hardware components of said module, said receiving module capable of receiving external data, said external data being stored on said logic module.

21. The coin device of claim 1, wherein said module and said protective casing are removably mated through a connection joint.

22. The coin device of claim 21, wherein said connection joint may be from a group comprised of a rivet connection, a threaded connection, a fastener connection, a snap socket connection, a bayonet connection, a welded connection, a connection by means of adhesive, a solder connection, or a stitched connection.

23. The coin device of claim 1, wherein said flat display screen is substantially shatter proof and impregnable to corrosive elements comprised of water and air.

24. The coin device of claim 1, wherein said module is manufactured from self-insulating materials.

25. The coin device of claim 1, further comprised of a bottom display screen.

26. The coin device of claim 1, wherein said coin device can be manufactured from a group of techniques comprised of using casting, stamping, minting, milling, cutting, chipping, using galvanoplastic, galvanostegy, and 3D printing or a combination of said techniques.

* * * * *